(12) United States Patent
Akopian (10) Patent No.: US 7,286,594 B2
(45) Date of Patent: Oct. 23, 2007

(54) DETERMINATION OF THE CORRELATION PHASE BETWEEN A SIGNAL AND A REPLICA SEQUENCE

(75) Inventor: David Akopian, Tampere (FI)

(73) Assignee: Nokia Corporation, Espoo (FI)

( * ) Notice: Subject to any disclaimer, the term of this patent is extended or adjusted under 35 U.S.C. 154(b) by 832 days.

(21) Appl. No.: 10/692,287

(22) Filed: Oct. 23, 2003

(65) Prior Publication Data

US 2004/0130486 A1 Jul. 8, 2004

(30) Foreign Application Priority Data

Oct. 24, 2002 (WO) ............... PCT/IB02/04420

(51) Int. Cl.
*H04B 1/00* (2006.01)
(52) U.S. Cl. .................. 375/152; 375/150; 375/147
(58) Field of Classification Search ............ 375/152, 375/326, 149–150, 143, 147; 708/422
See application file for complete search history.

(56) References Cited

U.S. PATENT DOCUMENTS

| | | | | |
|---|---|---|---|---|
| 6,108,317 | A * | 8/2000 | Jones et al. ............... 370/320 |
| 6,178,197 | B1 * | 1/2001 | Froelich et al. ........... 375/150 |
| 6,330,292 | B1 | 12/2001 | Urabe et al. |
| 6,366,938 | B1 * | 4/2002 | Levison et al. ........... 708/422 |
| 6,421,372 | B1 * | 7/2002 | Bierly et al. ............. 375/143 |
| 2001/0033606 | A1 | 10/2001 | Akopian |
| 2001/0048714 | A1 | 12/2001 | Jha |
| 2002/0110184 | A1 * | 8/2002 | Akopian et al. .......... 375/149 |
| 2003/0108126 | A1 * | 6/2003 | Akopian .................. 375/326 |
| 2003/0110015 | A1 | 6/2003 | Akopian |
| 2004/0196894 | A1 * | 10/2004 | Akopian .................. 375/150 |
| 2004/0196895 | A1 * | 10/2004 | Akopian .................. 375/150 |
| 2005/0163201 | A1 * | 7/2005 | Krasner .................. 375/150 |

FOREIGN PATENT DOCUMENTS

EP 1191703 A1 3/2002

OTHER PUBLICATIONS

Interim Guidelines for Examination of Patent Applications for Patent Subject Matter Elgibility, pp. 50-54.*
"Global Positioning System Overview", P. Dana, from the Internet, downloaded Oct. 18, 2002.

* cited by examiner

*Primary Examiner*—Mohammed Ghayour
*Assistant Examiner*—Lawrence Williams (57) ABSTRACT

The invention relates to a method for determining the correlation phase between a signal received at a receiver and a replica sequence. A matched filter multiplies samples (21) of the received signal with samples (22) of the replica and sums the resulting products to obtain a correlation value for a specific correlation phase. The samples of the received signal and the replica are shifted relative to each other for each correlation phase that is to be checked. In order to reduce the computational load, it is proposed that results obtained in the correlation calculations for one correlation phase are used by the matched filter also for calculations for a subsequent correlation phase. The invention relates equally to a corresponding receiver, to an electronic device comprising such a receiver, to a device cooperating with such a receiver and to a corresponding system.

19 Claims, 3 Drawing Sheets

DETERMINATION OF THE CORRELATION PHASE BETWEEN A SIGNAL AND A REPLICA SEQUENCE

CROSS-REFERENCE TO RELATED APPLICATION

This application claims priority under 35 U.S.C. §119 from International Application PCT/IB02/04420 filed Oct. 24, 2002.

BACKGROUND OF THE INVENTION

1. Technical Field

The invention relates to a method for determining the correlation phase between a signal received at a receiver and an available replica sequence by using a matched filter checking various correlation phases. The invention relates equally to a receiver, to an electronic device and a communication system comprising such a receiver, and to a device communicating with such a receiver.

2. Discussion of Related Art

The correlation phase between a signal received at a receiver and an available replica sequence has to be determined for example for CDMA (Code Division Multiple Access) spread spectrum receivers.

For a spread spectrum communication in its basic form, a data sequence is used by a transmitting unit to modulate a sinusoidal carrier and then the bandwidth of the resulting signal is spread to a much larger value. For spreading the bandwidth, the single-frequency carrier can be multiplied for example by a high-rate binary pseudo-random noise (PRN) code sequence comprising values of −1 and 1, which code sequence is known to a receiver. Thus, the signal that is transmitted includes a data component, a PRN component, and a sinusoidal carrier component. A PRN code period comprises typically 1023 chips, the term chips being used to designate the bits of the code conveyed by the transmitted signal, as opposed to the bits of the data sequence.

A well known system which is based on the evaluation of such CDMA code modulated signals is GPS (Global Positioning System). In GPS, code modulated signals are transmitted by several satellites that orbit the earth and received by GPS receivers of which the current position is to be determined. Each of the satellites transmits two microwave carrier signals. One of these carrier signals L1 is employed for carrying a navigation message and code signals of a standard positioning service (SPS). The L1 carrier signal is modulated by each satellite with a different C/A (Coarse Acquisition) Code known at the GPS receivers. Thus, different channels are obtained for the transmission by the different satellites. The C/A code, which is spreading the spectrum over a 1 MHz bandwidth, is repeated every 1023 chips, the epoch of the code being 1 ms. The carrier frequency of the L1 signal is further modulated with the navigation information at a bit rate of 50 bit/s. The navigation information, which constitutes a data sequence, can be evaluated for example for determining the position of the respective receiver.

A receiver of a code modulated signal has to have access to a synchronized replica of the modulation code, in order to be able to de-spread the data sequence of the signal. To this end, a synchronization has to be performed between the received code modulated signal and an available replica code sequence. Usually, an initial synchronization called acquisition is followed by a fine synchronization called tracking. In both synchronization scenarios, a correlator is used to find the best match between the replica code sequence and the received signal and thus to find their relative shift called code phase or, more generally, correlation phase. The search can be performed with different assumptions on an additional frequency modulation of the received signal. Such an additional modulation may occur for example due to a Doppler effect and/or a receiver clock inaccuracy and be as large as +/−6 kHz. Similarly, a correlation phase between some other kind of received signal, e.g. a radar signal, and a corresponding replica sequence might have to be determined by a correlator for enabling an evaluation of the received signal.

A correlator aligns the incoming signal with the replica sequence, multiplies the elements elementwise and integrates the resulting products. If the alignment is correct, then the correlation results in a larger response compared to the case of a misalignment. Thus, detecting the correlation peak is suited to find the correlation phase.

Two main types of correlators have been suggested so far. A first type of correlators performs a direct correlation of a replica sequence and the received signal in the time domain. This implies that a dedicated processing step is carried out for each possible correlation phase. In case there is a large number of correlation phases to check, the computational burden is significant, which is critical especially for software based receivers. There exist different implementation approaches for the first type of correlators. They may be formed in particular with matched filters or ordinary correlators. A second type of correlators relies on frequency domain techniques employing Discrete Fourier Transforms (DFT), which enable a parallel processing for all possible correlation phases. Thus, the DFT based correlators enable a reduction of the computational burden, in particular if the DFTs are realized as Fast Fourier Transforms (FFT).

Nevertheless, the first type of correlator is still widely used. One reason for this is the simplicity of the implementation. While the FFT might be suited to reduce the complexity of the correlator, the use of FFT requires complicated algorithms. Moreover, the FFT approximates calculations due to the use of transform coefficients. Another reason for further performing calculations in the time domain is that while in principle, the phase of the received signal relative to the available replica sequence can have any possible value, in some situations, the range of the possible correlation phases can be reduced based on some a-priori knowledge. Currently, however, a limited search of correlation phases can only be realized with correlators performing a correlation in the time domain. Known DFT based methods inherently perform the search of all possible correlation phase in parallel. Therefore, their usage is not feasible in situations in which the search is to be carried out only over a limited number of all possible correlation phases.

SUMMARY OF THE INVENTION

It is an object of the invention to reduce the computational load of correlators performing a correlation in the time domain. More specifically, it is an object of the invention to reduce the computational load of matched filters which are employed for determining the correlation phase between a received signal and an available replica sequence.

In a method according to the invention, a matched filter multiplies samples of the received signal with samples of the replica sequence and sums the resulting products to obtain a correlation value for a specific correlation phase. The multiplication performed by the matched filter can be for instance an elementwise multiplication. The samples of the received signal and the samples of the available replica sequence are shifted relative to each other for each correlation phase which is to be checked. It is proposed that results obtained in the calculations for one correlation phase are used by the matched filter also for calculations for a subsequent correlation phase.

A conventional matched filter, in contrast, performs the calculations for each correlation phase independently.

Moreover, a receiver, an electronic device comprising a receiver and some other device are proposed, either comprising means for carrying out the steps of the proposed method. The electronic device can be for instance a mobile terminal which is capable of communicating with a communication network. In case the processing is performed in another unit than the receiver, the required information about the received signals is forwarded by the receiver to this unit. The proposed other device can be for instance a network element of a network. The object is also reached with a system comprising a receiver and a device, in which system either the receiver or the device comprises means for carrying out the steps of the proposed method. In case the receiver performs the processing, the device may provide assistance data to the receiver.

The invention proceeds from the consideration that usually, a replica sequence will comprise several sub-sequences of at least twice the same value in a row. When the received samples and the replica samples are shifted by one position relative to each other after a correlation value for one correlation phase has been determined, thus partly the same multiplication results are required again when determining the correlation value of the next correlation phase. This occurrence can be exploited for reducing the number of multiplications and/or summings for a respective next correlation phase, since the used replica sequence is known.

It is an advantage of the invention that the number of operations can be reduced, and thus the employed processing means, either hardware or software, may be slower compared to known methods. The frequency requirement is reduced for software, which allows one to employ software correlators with a lower frequency. Thus, the invention facilitates the use of software correlators. If the operations are carried out slowly, also the power consumption can be reduced.

Alternatively, the reduced number of operations can be used for carrying out the processing faster than before.

If the operations are carried out in a fast manner, the acquisition of signals and following operations like a positioning can be accelerated.

Due to the reduced number of operations, the matched filter is also particularly easy to implement and more competitive with DFT based correlators.

Preferred embodiments of the invention become apparent from the dependent claims.

The amount of operations can be reduced with the invention for any kind of signal which has to be correlated with an available replica sequence. The received signal can be for instance a code modulated signal and the replica sequence a replica code sequence.

The invention is of particular advantage, when the received signal comprises a binary sequences, for instance a BPSK (binary phase shift keying) binary code with which the signal is modulated. A BPSK binary code is employed e.g. in GPS. A binary sequence is composed of the values +1 and −1. In case the signal comprises a binary sequence, only about half of the elements will change their values from one replica sample to the next. The required amount of operations for the correlation can therefore be halved with the invention. As a result, the hardware or software could be half as fast to obtain a correlation phase with the same speed as with a known matched filter, or the acquisition of a correlation phase could be twice as fast compared to a known matched filter when using the same hardware or software. Still, the invention is also of advantage when used in other systems, in which the two input signals to the matched filter may be composed of any number of any discrete values.

The multiplications in the correlation calculations can be performed in different ways. For example, in case the received signal and the available replica sequence comprise a binary sequence consisting of the values +1 and −1, the multiplications may be realized e.g. simply with a sign change for each required multiplication by −1.

The results of correlation calculations for a preceding correlation phase can be made use of in several ways when determining the correlation value for the current correlation phase. The most suitable way may also depend on the kind of sequence comprised in the received signal, e.g. on the employed code. For example, the entire correlation value resulting for a preceding correlation phase can be used as basis, which is then corrected for the current correlation phase. In one alternative, only those multiplication results of a preceding correlation phase which are known to stay the same are re-used for the current correlation phase.

The invention can be used in both, acquisition and tracking schemes.

In both cases, the invention may be used for determining the correlation phase and the frequency of a remaining complex sinusoidal modulation. The correlation phase is determined according to the peaks of a cross-correlation function, and the correlation is calculated e.g. at initial code wipe-off stages. The processing for weak signals requires additional coherent and non-coherent integrations. The invention can therefore also be used as a building block for other methods implementing different scenarios of coherent and/or non-coherent processing for possible multiple frequency candidates.

As indicated above, the invention can be implemented in hardware or in software. In case the invention is employed as part of acquisition and tracking algorithms, the implementation corresponds advantageously to the implementation of these algorithms.

The invention can be used in any system which uses matched filters. It can be employed in particular, though not exclusively, in a communication system using CDMA spread spectrum receivers, for instance in a positioning system like GPS or Galileo. Alternatively, it could be employed for example in radar technology.

BRIEF DESCRIPTION OF THE FIGURES

Other objects and features of the present invention will become apparent from the following detailed description considered in conjunction with the accompanying drawings, wherein.

DETAILED DESCRIPTION OF THE INVENTION

Figure 1:
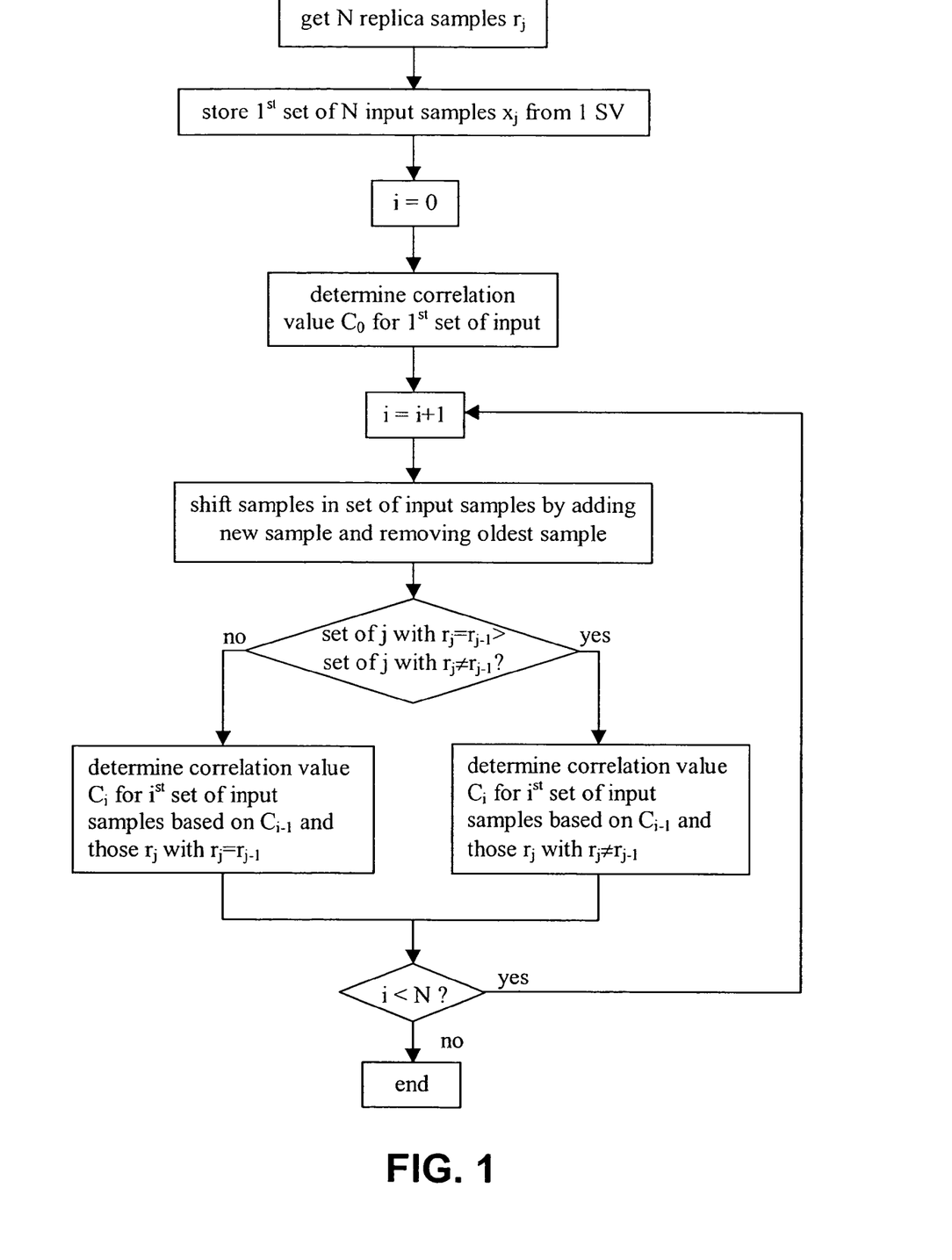
FIG. 1 illustrates an embodiment of the method according to the invention.

FIG. 1 illustrates an exemplary embodiment of the method according to the invention implemented in a GPS receiver.

Figure 3:
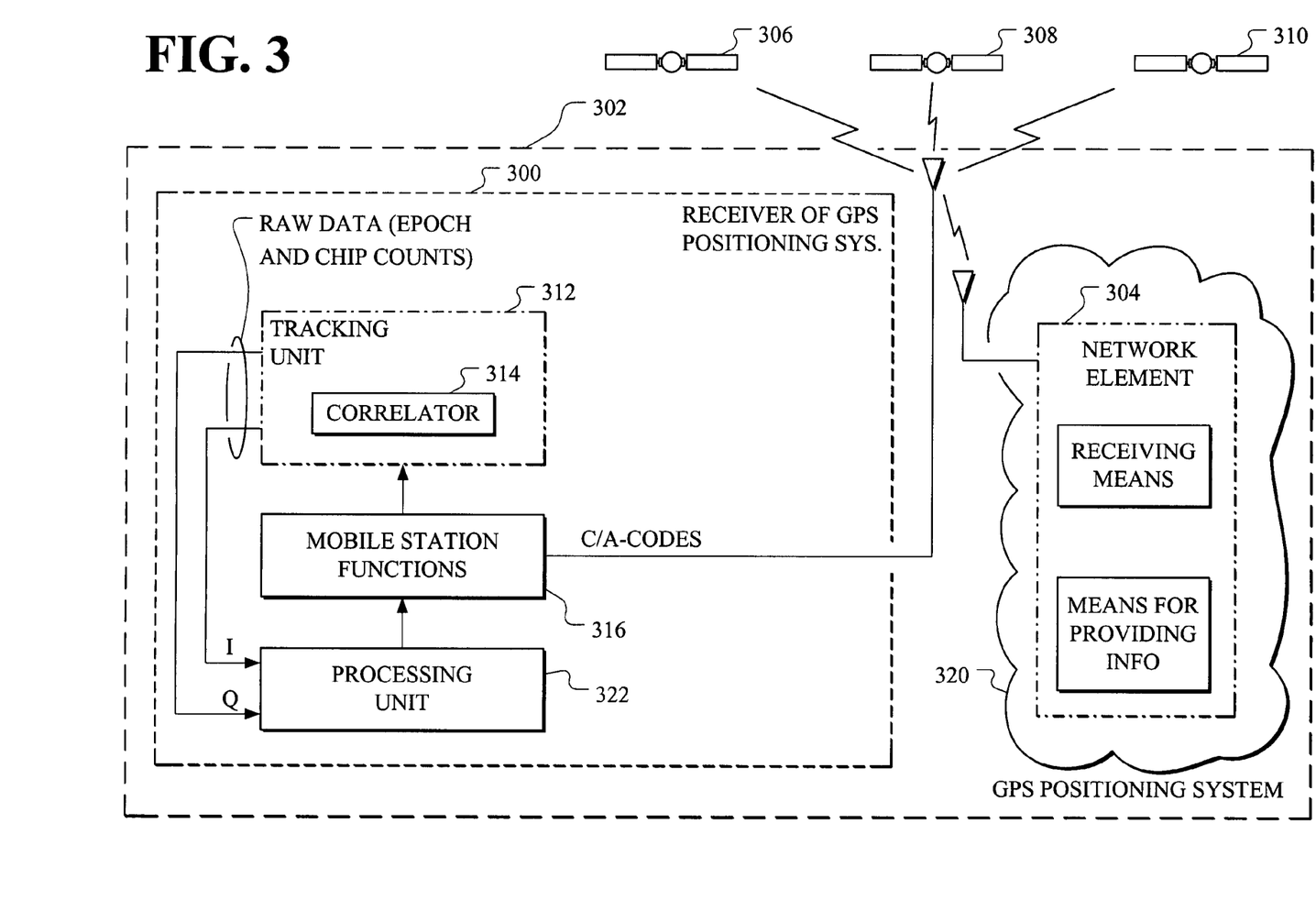
FIG. 3 shows a system according to the invention.

FIG. 3 illustrates a device 300 deployed in a system 302 which may include other devices such as the illustrated network element 304. The system 302 may be responsive to signals from a plurality of satellites such as GPS satellites. The device 300 as well as the network element 304 are each shown having an antenna responsive to such signals from the satellites and also able to communicate between each other wirelessly. The system 302 may be viewed as including the satellites 306, 308, 310 for instance forming a GPS positioning system. Such a device 300 in that context would be the receiver of GPS satellite signals from several GPS satellites. It is able to track at least one of the satellites by a tracking loop realized in a tracking unit 312 of the receiver 300 by means of a correlator 314. Further, the GPS receiver 300 may include the functions of a mobile station 316 and thereby being able to communicate with the network element 304 in the form of a base station of a mobile communication network 320 to which the receiver 300 is shown currently connected. The receiver 300 includes a processing unit 322 for carrying out for instance the algorithm shown in FIG. 1.

The GPS receiver 300 comprises, as shown, a receiving unit for receiving the signals via an antenna from the different GPS satellites 306, 308, 310 which are modulated with different C/A-codes. The C/A codes employed by the satellites for modulating the signals are BPSK binary PRN codes consisting of only +1 and −1. As mentioned, the GPS receiver 300 moreover includes a tracking unit 312 with a correlator 314. The correlator employs a matched filter for acquiring and tracking received satellite signals. The depicted method is implemented more specifically in this matched filter. The receiver further stores a replica code sequence for each of the satellites, which are also called space vehicles SV. Also the positions of sign changes in the stored replica code sequences are known to the receiver.

For determining the correlation between a signal received from one of the satellites SV and the corresponding replica code sequence, as shown in FIG. 1, first this replica code sequence is retrieved. The number of samples of the replica code sequence (N) depends on the length of the code employed by the respective satellite for modulating the signal. It also depends on the sampling rate of the incoming signal. E.g., in case of 1 sample per chip sampling, the replica code sequence length is N=1023. The samples of the retrieved replica code sequence are denoted as:

$$r_{N-1}, r_{N-2}, \ldots, r_3, r_2, r_1, r_0$$

A counter value i counting the code phases that are to be checked is set to i=0.

Further, a first set of consecutive samples of a received code modulated signal is stored in a memory of the receiver. The received and stored samples are denoted as:

$$x_{N-1}, x_{N-2}, \ldots, x_3, x_2, x_1, x_0$$

These samples are multiplied elementwise with samples of the retrieved replica code sequence.

The resulting products are then summed, in order to obtain a correlation value $C_0$ for the first code phase.

In the following, a loop is entered for determining the correlation values also for subsequent code phases. As shown in FIG. 1, for each code phase that is to be checked, the counter value i is incremented by 1 at the beginning of the loop.

Further, the memory of the receiver is updated for each code phase by removing the respective oldest sample and by introducing a new sample. For the second code phase, for example, a new sample $x_N$ of the incoming signal is added to the set of consecutive samples, while the oldest sample $x_0$ is removed from the memory. The stored set of N samples for the second code phase is thus given by:

$$x_N, x_{N-1}, x_{N-2}, \ldots, x_3, x_2, x_1$$

The replica code sequence, in contrast, stays the same for all code phases, therefore a relative shift is obtained between the received samples and the replica samples.

Based on the respective new set of code samples, a correlation value $C_1$ is also calculated for the second code phase and later on for the subsequent code phases. In contrast to a conventional correlation, however, multiplications are not carried out for all samples of the respective set of received code samples, as will be explained in the following.

When comparing the first set of stored input samples with the second set of stored input samples, it can be seen that the samples $x_{N-1}, x_{N-2}, \ldots, x_3, x_2, x_1$ occur in both sets, even though they are aligned differently with the replica samples. In case a shifted received sample is aligned with a replica sample of the same value as before, the multiplication for this sample will also have the same result as before, which can be made use of.

The conventional correlator output, i.e. the correlation value $C_i$ for a specific code phase i, can be written as:

$$C_i = \sum_{j=0}^{N-1} r_j x_{j+i}$$

First this sum can be split, taking out the respective oldest sample $x_i$:

$$C_i = \sum_{j=0}^{N-1} r_j x_{j+i} = r_0 x_i + \sum_{j=1}^{N-1} r_j x_{j+i}$$

Then, the remaining sum can be considered to be composed of two subsums:

$$C_i = r_0 x_i + \sum_{j \in J_+} r_j x_{j+i} + \sum_{j \in J_-} r_j x_{j+i}$$

The first subsum contains the multiplications of input samples with those replica samples which have the same sign as the respective preceding replica sample. The set of the values of j identifying these replica samples is denoted as $J_+$, where $$j \in J_+ \text{ if } (r_j=1 \ \& \ r_{j-1}=1) \text{ OR } (r_j=-1 \ \& \ r_{j-1}=-1).$$

The second subsum contains the multiplications of input samples with those replica samples which have another sign than the respective preceding replica sample. The set of the values of j identifying these replica samples is denoted as $J_-$, where $j \in J_-$ if $(r_j=1$ & $r_{j-1}=-1)$ OR $(r_j=-1$ & $r_{j-1}=1)$.

Figure 2:
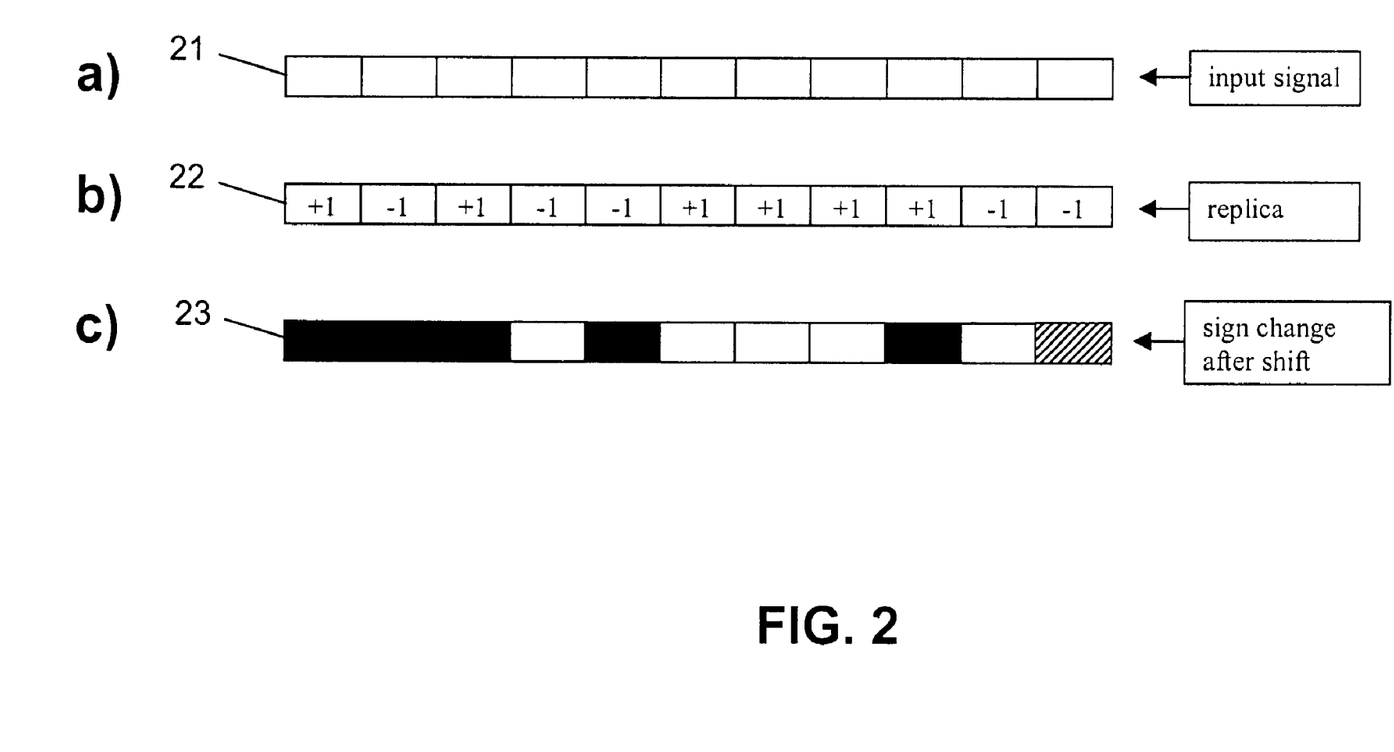
FIG. 2a shows a sequence of samples of a received code modulated signal.
FIG. 2b shows samples of a binary replica code sequence.
FIG. 2c indicates sign changes in the replica code sequence of FIG. 2b.

For illustration, FIG. 2a shows a row of eleven rectangles 21 representing consecutive samples of a part of a stored set of input samples without indication of any specific values. FIG. 2b shows a row of eleven rectangles 22 representing samples of a part of an exemplary replica code sequence having from left to right the values $\{+1, -1, +1, -1, -1, +1, +1, +1, +1, -1, -1\}$. The indices of the input samples x and the replica samples r increases from left to right. While the replica samples remain unchanged for all code phases, the input samples are shifted for each new code phase by one sample to the right, such that the oldest sample is removed from the set of samples and a new sample is introduced to the set of samples at the left hand side.

FIG. 2c points out by means of a further row of eleven rectangles 23 those replica samples of FIG. 2b which provide the same sign for an associated input sample of FIG. 2a as will be provided to this input sample after a shift, i.e. those replica samples $r_j$ which are identical to the respective preceding replica sample $r_{j-1}$. These replica samples are indicated with an associated white rectangle, while the replica samples providing another sign than the preceding replica sample are indicated with an associated black rectangle. Thus, the $4^{th}$, $6^{th}$, $7^{th}$, $8^{th}$ and $10^{th}$ rectangle from the left is white, and the $1^{st}$, $2^{nd}$, $3^{rd}$, $5^{th}$ and $9^{th}$ rectangle from the left is black. Since only part of the entire code is depicted, the $11^{th}$ replica sample from the left cannot be told from the figure to repeat or invert the preceding sample, and thus a hatched rectangle is associated to it.

The elementwise multiplication with the replica samples indicated with a white rectangle will result in the same product before a shift as the elementwise multiplication with the preceding replica samples after a shift. For example, if the $6^{th}$ input sample from the left is assumed to have a value "a", the elementwise multiplication will result in $(+1)*a$, since the value of the $6^{th}$ replica sample is $+1$. After the shift by one sample to the right for the next code phase, "a" will constitute the value of the $7^{th}$ sample from the left in FIG. 2a. Since the $7^{th}$ replica sample has equally a value of $+1$, the elementwise multiplication will result again in $(+1)*a$.

The indices of those replica samples to which a white rectangle is associated are part of the set $J_+$, while the indices of those replica samples to which a black rectangle is associated are part of the set $J_-$.

With the above definitions, the correlation value $C_{i+1}$ for a respective next code phase $i+1$ can be written as:

$$C_{i+1} = -C_i - r_0 x_i + r_{N-1} x_{i+N} + \sum_{j \in J_+} 2 * r_j x_{j+i} \qquad (1)$$

or alternatively as:

$$C_{i+1} = C_i - r_0 x_i + r_{N-1} x_{i+N} - \sum_{j \in J_-} 2 * r_j x_{j+i} \qquad (2)$$

In the example presented in FIGS. 2a to 2c, the sets $J_+$ and $J_-$ are approximately of the same size. This means that with both equations, instead of performing N additions at each stage, only N/2+3 additions are needed, plus some shifts for realizing the multiplications by 2. These shifts could be incorporated into the addition operation without increasing the cost of operation.

Sometimes, however, the distribution of the indices of the replica samples to the sets $J_+$ and $J_-$ may vary between different replica code sequences.

In the embodiment of the method illustrated in FIG. 1, it is therefore first checked, which one of the sets $J_+$ and $J_-$ has a larger size. For each replica, the equation (1) or (2) is selected which causes the minimum number of operations depending on the number of samples in the sets $J_+$ and $J_-$. That is, in case the set $J_+$ comprises less samples, equation (1) is used, while in case the set $J_-$ comprises less samples, equation (2) is used for determining the correlation for the next code phase. Thus, there will be different equations used for different codes.

It is to be noted that the actual comparison between the sizes of sets $J_+$ and $J_-$ does not have to be carried out in real time during the matched filter operation. Since the replica code sequences for all satellites are known and the sign-changes within the replica code sequences as well, the sizes of the two sets can easily be determined and compared beforehand and the result be stored for use by the matched filter. Then, it will be known at the matched filter without any computational requirements that for one satellite the first option should be used, while for another satellite, the second option should be used. With this approach, at least a reduction in complexity by half is achieved.

Alternatively, one of the equations (1) or (2) could be determined to be used for all replica code sequences. In this case, a reduction in complexity by half will be achieved on an average.

The described loop will be continued for a respective subsequent code phase, until a correlation value $C_i$ has been determined for all N code phases that are to be checked.

The correct code phase can then be obtained by determining the maximum correlation value out of all determined correlation values.

The presented embodiment can easily be generalized for replica sequences composed of samples with values from any discrete set, preferably with a small number of elements. For binary replica sequences, this set contains only $+1$ and $-1$, as mentioned above, and has thus just two elements.

It is to be noted that the described embodiment constitutes only one of a variety of possible embodiments of the invention.

The invention claimed is:

1. Method for determining a correlation phase between a signal received from a satellite at a receiver and an available replica sequence comprising
   using a matched filter to check various correlation phases, said matched filter
   multiplying samples of said received signal with samples of said replica sequence and
   summing the resulting products to obtain a correlation value for a specific correlation phase, said method further comprising
   shifting samples of said received signal and of said available replica sequence relative to each other for each correlation phase which is checked, and
   using results obtained in the calculations for one correlation phase by said matched filter for calculating a subsequent correlation phase, and
   determining a current position of said receiver, wherein said received signal comprises a binary sequence,
   wherein possible values of said binary sequence are $+1$ and $-1$, wherein $C_i$ constitutes a determined correlation value for an $i^{th}$ checked correlation phase, wherein N is a length of said binary sequence, wherein $x_{j+i}$ constitutes a $j^{th}$ sample of said received signal for said $i^{th}$ correlation phase, wherein the samples of said replica sequence are not shifted for different correlation phases which are to be checked, wherein $r_j$ constitutes a $j^{th}$ sample of said replica sequence, wherein a set $J_+$ comprises the indices j for which ($r_j=1$ & $r_{j-1}=1$) OR ($r_j=-1$ & $r_{j-1}=-1$), and wherein a correlation value $C_{i+1}$ for the $(i+1)^{th}$ correlation phase is calculated as:

$$C_{i+1} = -C_i - r_0 x_i + r_{N-1} x_{i+N} + \sum_{j \in J_+} 2 * r_j x_{j+i}.$$

2. Method according to claim 1, wherein said matched filter multiplies said samples of said received signal elementwise with samples of said replica sequence.

3. Method for determining a correlation phase between a signal received from a satellite at a receiver and an available replica sequence comprising
using a matched filter to check various correlation phases, said matched filter
multiplying samples of said received signal with samples of said replica sequence and
summing the resulting products to obtain a correlation value for a specific correlation phase, said method further comprising
shifting samples of said received signal and of said available replica sequence relative to each other for each correlation phase which is checked, and
using results obtained in the calculations for one correlation phase by said matched filter for calculating a subsequent correlation phase, and
determining a current position of said receiver,
wherein said received signal comprises a binary sequence, wherein possible values of said binary sequence are +1 and −1,
wherein $C_i$ constitutes the determined correlation value for an $i^{th}$ checked correlation phase i, wherein N is the length of said binary sequence, wherein $x_{j+i}$ constitutes a $j^{th}$ sample of said received signal for said $i^{th}$ correlation phase, wherein the samples of said replica sequence are not shifted for the different correlation phases which are to be checked, wherein $r_j$ constitutes a $j^{th}$ samples of a said replica sequence, wherein a set $J_-$ comprises the indices j for which ($r_j=1$ & $r_{j-1}=-1$) OR ($r_j=-1$ & $r_{j-1}=1$), and wherein a correlation value $C_{i+1}$ for the $(i+1)^{th}$ correlation phase is calculated as:

$$C_{i+1} = C_i - r_0 x_i + r_{N-1} x_{i+N} - \sum_{j \in J_-} 2 * r_j x_{j+i}.$$

4. Method for determining a correlation phase between a signal received from a satellite at a receiver and an available replica sequence comprising
using a matched filter to check various correlation phases, said matched filter
multiplying samples of said received signal with samples of said replica sequence and
summing the resulting products to obtain a correlation value for a specific correlation phase, said method further comprising
shifting samples of said received signal and of said available replica sequence relative to each other for each correlation phase which is checked, and
using results obtained in the calculations for one correlation phase by said matched filter for calculating a subsequent correlation phase, and
determining a current position of said receiver,
wherein said received signal comprises a binary sequence, wherein possible values of said binary sequence are +1 and −1, wherein $C^i$ constitutes a determined correlation value for an $i^{th}$ checked correlation phase, wherein N is the length of said binary sequence, wherein $x_{j+i}$ constitutes a $j^{th}$ sample of said received signal for said $i^{th}$ correlation phase, wherein the samples of said replica sequence are not shifted for the different correlation phases which are to be checked, wherein $r_j$ constitutes a $j^{th}$ sample of said replica sequence, wherein a set $J_+$ comprises the indices j for which ($r_j=1$ & $r_{j-1}=1$) OR ($r_j=-1$ & $r_{j-1}=-1$), wherein a set $J_-$ comprises the indices j for which ($r_j=1$ & $r_{j-1}=-1$) OR ($r_j=-1$ & $r_{j-1}=1$), and wherein a correlation value $C_{i+1}$ for the $(i+1)^{th}$ correlation phase is calculated as:

$$C_{i+1} = -C_i - r_0 x_i + r_{N-1} x_{i+N} + \sum_{j \in J_+} 2 * r_j x_{j+i},$$

if the size of said set $J_-$ is larger than the size of said set $J_+$, and as:

$$C_{i+1} = C_i - r_0 x_i + r_{N-1} x_{i+N} - \sum_{j \in J_-} 2 * r_j x_{j+i},$$

if the size of said set $J_+$ is larger than the size of said set $J_-$.

5. Method according to claim 1, further comprising a subsequent coherent and/or noncoherent processing for handling signals of low strength.

6. Method according to claim 1, wherein said received signal is a code modulated signal, and wherein said replica sequence is a replica code sequence.

7. Method according to claim 6, wherein said code modulation of said received code modulated signal is a Code Division Multiple Access (CDMA) spread spectrum modulation.

8. Use of a method according to claim 1 in a process for acquisition and/or tracking of signals received at a receiver.

9. Receiver comprising
receiving means for receiving signals; and
processing means for carrying out the method according to claim 2.

10. Receiver according to claim 9, which receiver is a receiver of a positioning system.

11. Electronic device comprising a receiver according to claim 9.

12. Electronic device according to claim 11, wherein said electronic device is a mobile terminal capable of communicating with a communication network.

13. Device comprising
means for receiving from a receiver information on signals received by said receiver; and
processing means for carrying out the method according to claim 2.

14. Device according to claim 13, which device is a network element of a network.

15. System comprising
   a receiver comprising means for receiving signals, and means for providing information on received signals; and
   a device according to claim 13.
16. System comprising
   a receiver according to claim 9; and
   a device for providing assistance data to said receiver.
17. System according to claim 16, wherein said device is a network element of a network.
18. System according to claim 16, wherein said system is a positioning system.
19. System according to claim 15, wherein said system is a positioning system.

* * * * *

UNITED STATES PATENT AND TRADEMARK OFFICE
CERTIFICATE OF CORRECTION

| | |
|---|---|
| PATENT NO. | : 7,286,594 B2 |
| APPLICATION NO. | : 10/692287 |
| DATED | : October 23, 2007 |
| INVENTOR(S) | : David Akopian |

It is certified that error appears in the above-identified patent and that said Letters Patent is hereby corrected as shown below:

In column 10 at line 10, please delete "$C^i$" and insert --$C_i$-- therefor.

In column 10 at line 53, please delete "2" and insert --1-- therefor.

In column 10 at line 65, please delete "2" and insert --1-- therefor.

Signed and Sealed this

Twenty-fourth Day of March, 2009

JOHN DOLL
*Acting Director of the United States Patent and Trademark Office*